United States Patent
Fang et al.

(10) Patent No.: US 12,260,327 B2
(45) Date of Patent: Mar. 25, 2025

(54) OPTIMIZER LEARNING METHOD AND APPARATUS, ELECTRONIC DEVICE AND READABLE STORAGE MEDIUM

(71) Applicant: Beijing Baidu Netcom Science and Technology Co., Ltd., Beijing (CN)

(72) Inventors: Xiaomin Fang, Beijing (CN); Fan Wang, Beijing (CN); Yelan Mo, Beijing (CN); Jingzhou He, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 795 days.

(21) Appl. No.: 17/210,141

(22) Filed: Mar. 23, 2021

(65) Prior Publication Data

US 2022/0004867 A1 Jan. 6, 2022

(30) Foreign Application Priority Data

Jul. 1, 2020 (CN) .......................... 202010625746.7

(51) Int. Cl.
  *G06N 3/08* (2023.01)
  *G06F 18/20* (2023.01)
  *G06N 20/00* (2019.01)

(52) U.S. Cl.
  CPC ............. *G06N 3/08* (2013.01); *G06F 18/285* (2023.01); *G06N 20/00* (2019.01)

(58) Field of Classification Search
  CPC ......... G06N 3/08; G06N 20/00; G06F 18/285
  See application file for complete search history.

(56) References Cited

U.S. PATENT DOCUMENTS

| 11,354,594 B2 * | 6/2022 | Chen ...................... G06N 3/084 |
| 2019/0095785 A1 * | 3/2019 | Sarkar .................... G06N 20/00 |

(Continued)

FOREIGN PATENT DOCUMENTS

| CN | 111353610 A * | 2/2020 | ............ G06N 3/044 |
| KR | 20200015048 A | 2/2020 | |
| WO | 2019165462 A1 | 8/2019 | |

OTHER PUBLICATIONS

Ravi, Sachin, and Hugo Larochelle. "Optimization as a model for few-shot learning." (Year: 2016).*

(Continued)

*Primary Examiner* — Michelle T Bechtold
*Assistant Examiner* — Matiyas T Maru
(74) *Attorney, Agent, or Firm* — Kwan & Olynick LLP

(57) ABSTRACT

The present application discloses an optimizer learning method and apparatus, an electronic device and a readable storage medium, which relates to the field of deep learning technologies. An implementation solution adopted by the present application during optimizer learning is: acquiring training data, the training data including a plurality of data sets each including neural network attribute information, neural network optimizer information, and optimizer parameter information; and training a meta-learning model by taking the neural network attribute information and the neural network optimizer information in the data sets as input and taking the optimizer parameter information in the data sets as output, until the meta-learning model converges. The present application can implement self-adaptation of optimizers, so as to improve generalization capability of the optimizers.

6 Claims, 2 Drawing Sheets

Acquire training data, the training data including a plurality of data sets each including neural network attribute information, neural network optimizer information, and optimizer parameter information — S101

Train a meta-learning model by taking the neural network attribute information and the neural network optimizer information in the data sets as input and taking the optimizer parameter information in the data sets as output, until the meta-learning model converges — S102

(56) References Cited

U.S. PATENT DOCUMENTS

| | | | |
|---|---|---|---|
| 2019/0244139 A1 | 8/2019 | Varadarajan et al. | |
| 2020/0160212 A1 | 5/2020 | Shin et al. | |
| 2020/0410649 A1* | 12/2020 | Kearney | G06N 3/08 |

OTHER PUBLICATIONS

Wang, Yu-Xiong, et al. "Low-shot learning from imaginary data." (Year: 2018).*

Peter et al., "A neural network ensemble method with jittered training data for time series forecasting." (Year: 2007).*

Chin et al. "Jitter decomposition of high-speed data signals from jitter histograms with a pole-residue representation using multilayer perceptron neural networks." (Year: 2019).*

Zur, et al., "Comparison of two methods of adding jitter to artificial neural network training." (Year: 2004).*

Ku, Chin Kui, et al. "Jitter decomposition of high-speed data signals from jitter histograms with a pole-residue representation using multilayer perceptron neural networks." (Year: 2019).*

Ravi, et al., "Optimization as a model for few-shot learning." (Year: 2017).*

Wang, et al., "Low-shot learning from imaginary data." (Year: 2018).*

George, et al., "A generative vision model that trains with high data efficiency and breaks text-based CAPTCHAs." (Year: 2017).*

Notice of Allowance for JP2021-049640, issued Oct. 14, 22, 3 pgs.

S.F. Masri, et al., "Training Neural Networks by Adaptive Random Search Techniques", Journal of Engineering Mechanics, vol. 125, No. 2, Feb. 1, 1999, pp. 123-132.

Summons to attend oral proceedings pursuant to Rule 115(1) EPC for EP21163596.6, issued Dec. 9, 22, 10 pgs.

Notice of Allowance for KR10-2021-0039189, issued on Nov. 20, 2023, 5 pgs.

Olga Wichrowska, et al., Learned Optimizers that Scale and Generalize, dated Mar. 14, 2017, 11 pgs.

Japanese First Office Action for App. No. JP2021-049640, 2 pages.

Thomas Hartmann, et al., Meta-Modelling Meta-Learning, 2019 ACM/IEEE 22nd International Conference on Model Driven Engineering Language and Systems, DOI 10.1109/MODELS.2019.00014, 8 pages.

European Search Report, EP Application No. 21163596.6, mailed Sep. 29, 2021, 11 pages.

Thomas Hartmann et al., "Meta-Modelling Meta-Learning", 2019 ACM/IEEE 22nd International Conference on Model Driven Engineering Languages and Systems, IEEE, Sep. 15, 2019, 6 pages.

Jasper Snoek et al., "Scalabale Bayesian Optimization Using Deep Neural Networks" In: "Proceedings of the 32nd International Conference on Machine Learning", Jul. 9, 2015, 10 pages.

Anonymous Anonymous, "Random search", Retrieved from the Internet: //en.wikipedia.org/w/index.php?title=Random_search&oldid=951937333 on Sep. 8, 2019.

* cited by examiner

OPTIMIZER LEARNING METHOD AND APPARATUS, ELECTRONIC DEVICE AND READABLE STORAGE MEDIUM

The present application claims the priority of Chinese Patent Application No. 202010625746.7, filed on Jul. 1, 2020, with the title of "Optimizer learning method and apparatus, electronic device and readable storage medium". The disclosure of the above application is incorporated herein by reference in its entirety.

FIELD OF THE DISCLOSURE

The present application relates to the field of artificial intelligence technologies, and particularly to an optimizer learning method and apparatus, an electronic device and a readable storage medium in the field of deep learning technologies.

BACKGROUND OF THE DISCLOSURE

A deep neural network is a common method in machine learning, which has been widely used in various fields in recent years. A training process of the deep neural network requires the use of an optimizer to make the network converge, that is, the optimizer is used to update network parameters to find an optimal point of the network. Therefore, the optimizer directly affects a convergence speed and a training effect of the network, and a slower convergence speed may increase the consumption of computing resources.

The prior art generally includes a human experience-based optimizer and a model-based optimizer. The human experience-based optimizer cannot be adapted according to different tasks and different network structures, and it needs to consume manpower and material resources to adjust parameters of the optimizer in different stages of training. Although the model-based optimizer can be adapted to some extent, it can be adapted only to a certain fixed or similar network structure and the same type of tasks, and has no generalization capability for different network structures and different types of tasks.

SUMMARY OF THE DISCLOSURE

A technical solution adopted by the present application to solve the technical problem is to provide an optimizer learning method, including: acquiring training data, the training data including a plurality of data sets each including neural network attribute information, neural network optimizer information, and optimizer parameter information; and training a meta-learning model by taking the neural network attribute information and the neural network optimizer information in the data sets as input and taking the optimizer parameter information in the data sets as output, until the meta-learning model converges.

A technical solution adopted by the present application to solve the technical problem is to provide an electronic device, comprising:

at least one processor; and a memory communicatively connected with the at least one processor;

wherein the memory stores instructions executable by the at least one processor, and the instructions are executed by the at least one processor to enable the at least one processor to perform an optimizer learning method, wherein the optimizer learning method comprise:

acquiring training data, the training data including a plurality of data sets each including neural network attribute information, neural network optimizer information, and optimizer parameter information; and training a meta-learning model by taking the neural network attribute information and the neural network optimizer information in the data sets as input and taking the optimizer parameter information in the data sets as output, until the meta-learning model converges.

There is provided a non-transitory computer readable storage medium with computer instructions stored thereon, wherein the computer instructions are used for causing a computer to perform an optimizer learning method, wherein the optimizer learning method comprise:

acquiring training data, the training data comprising a plurality of data sets each comprising neural network attribute information, neural network optimizer information, and optimizer parameter information; and training a meta-learning model by taking the neural network attribute information and the neural network optimizer information in the data sets as input and taking the optimizer parameter information in the data sets as output, until the meta-learning model converges.

One embodiment of the present application has the following advantages or beneficial effects: the present application can implement self-adaptation of optimizers and improve generalization capability of the optimizers. A technical means of establishing meta-learning model to learn parameters of optimizers of neural networks having different attribute information and optimizer information is employed; therefore, the technical problem in the prior art that optimizers cannot be adapted to neural networks with different network structures and different types of tasks is solved, and technical effects of implementing self-adaptation of the optimizers and improving generalization capability of the optimizers are achieved.

Other effects of the above alternatives will be described below with reference to specific embodiments.

BRIEF DESCRIPTION OF DRAWINGS

The accompanying drawings are intended to better understand the solution and do not constitute limitations on the present application. In the drawings.

DETAILED DESCRIPTION OF PREFERRED EMBODIMENTS

Exemplary embodiments of the present application are described below with reference to the accompanying drawings, including various details of the embodiments of the present application to facilitate understanding, and should be considered as exemplary only. Therefore, those of ordinary skill in the art should be aware that various changes and modifications can be made to the embodiments described herein without departing from the scope and spirit of the present application. Similarly, for clarity and simplicity, descriptions of well-known functions and structures are omitted in the following description.

Figure 1:
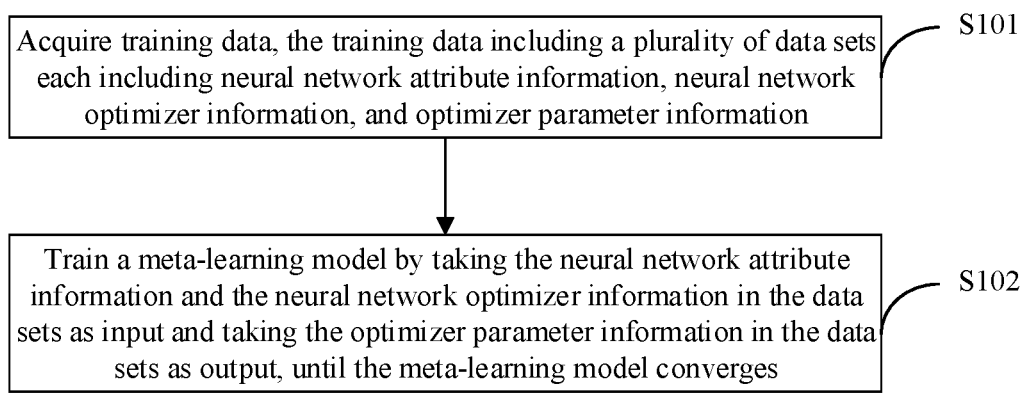
FIG. 1 is a schematic diagram of a first embodiment according to the present application.

FIG. 1 is a schematic diagram of a first embodiment according to the present application. As shown in FIG. 1, an optimizer learning method in the present embodiment may specifically include following steps.

S101: Training data is acquired, the training data including a plurality of data sets each including neural network attribute information, neural network optimizer information, and optimizer parameter information.

S102: A meta-learning model is trained by taking the neural network attribute information and the neural network optimizer information in the data sets as input and taking the optimizer parameter information in the data sets as output, until the meta-learning model converges.

According to the optimizer learning method in the present embodiment, a meta-learning model is established to learn parameters of optimizers of neural networks having different attribute information and optimizer information, so that the optimizers of the neural networks can be automatically adapted to neural networks having different attribute information, which implements self-adaptation of the optimizers, improves generalization capability of the optimizers, then speeds up training processes of the neural networks, and improves training effects of the neural networks.

The optimizers in the present embodiment may be functions, or neural network-based models, and are used to update parameters of neural networks corresponding thereto to make the neural networks converge. The neural networks in the present embodiment are deep neural networks.

The neural network attribute information in the data sets in the present embodiment includes at least one of neural network structure information and neural network task information, and is used to reflect network structures of neural networks and types of trained tasks. The neural network structure information may be a cyclic neural network (RNN), a convolutional neural network (CNN), and the like, and the neural network task information may be an image classification task, a text recognition task, and the like.

The neural network optimizer information in the data sets in the present embodiment represents types of optimizers that update neural network parameters, such as SGD, Momentum, and Adam. The optimizer parameter information corresponds to parameters of optimizers in each step of the training process of neural networks.

It is understandable that the data sets acquired in the present embodiment correspond to neural networks with different network structures, different types of training tasks, and different types of optimizers, and therefore, the trained meta-learning model can further improve generalization capability of optimizers for neural networks with different structures and different tasks.

Since the neural network attribute information acquired in the present embodiment includes neural network structure information and neural network task information, the trained meta-learning model in the present embodiment can estimate parameters of optimizers when neural networks with different structures are trained for different types of tasks.

After the data sets are acquired in the present embodiment, the meta-learning model is trained according to the above information included in each data set, until the meta-learning model converges. The meta-learning model in the present embodiment may be a neural network model.

In the present embodiment, the meta-learning model is trained by meta learning, so that the meta-learning model can learn parameters of optimizers of neural networks with different attribute information in the training process.

The meta learning in the present embodiment is "learning how to learn". That is, adaptive learning can also be performed by itself on new tasks by learning the learning experience of other tasks. The meta learning in the present embodiment mines parameters of optimizers of different neural networks in each step of the training process, so that the meta-learning model can estimate parameters of an optimizer of a neural network in each step of the training process according to attribute information and optimizer information of the neural network in a new task.

In the present embodiment, when the meta-learning model is trained according to the data sets, a loss function may be calculated according to an output result of the meta-learning model and parameter information in the data sets. When the calculated loss function converges, the meta-learning model may be considered to converge, and the training process of the meta-learning model is completed. In addition, in the present embodiment, the meta-learning model may also be obtained by performing meta learning based on a gradient or recursive model, which is not limited in the present embodiment.

Due to a long training sequence used in the optimizer learning and the need for thousands or even more iterations during training, existing meta learning methods are not very practical.

In order to further improve the training effect of the meta-learning model, in the training of the meta-learning model according to the data sets in the present embodiment, the following manner may be employed: taking a parameter of a current meta-learning model as a first parameter; jittering the first parameter by using noise, to acquire a plurality of jitter parameters, that is, slightly changing the first parameter, wherein the noise may be Gaussian noise; constructing a plurality of jitter meta-learning models according to the plurality of jitter parameters, that is, replacing the first parameter with the jitter parameters; training the plurality of jitter meta-learning models respectively by taking the neural network attribute information and the neural network optimizer information in the data sets as input and taking the optimizer parameter information in the data sets as output, wherein the data sets used in the jitter meta-learning models may be the same or different; and selecting, according to training results, a jitter meta-learning model satisfying a preset condition as a final meta-learning model.

It is understandable that in the present embodiment, the jitter meta-learning model with the smallest loss function may be selected as the meta-learning model satisfying the preset condition, or the jitter meta-learning model with the fastest convergence speed may be selected as the meta-learning model satisfying the preset condition.

In addition, in order to further improve the training accuracy of the meta-learning model, in the present embodiment, when a jitter meta-learning model satisfying a preset condition selected as a final meta-learning model according to training results, the following manner may be employed: determining, according to the training results, a jitter parameter of the jitter meta-learning model satisfying the preset condition; proceeding to the step of jittering the first parameter by using noise after the determined jitter parameter is taken as the first parameter; and taking the selected jitter meta-learning model as the final meta-learning model after a preset number of iterations. The preset number in the present embodiment may be set by a user according to an actual requirement.

In other words, the meta-learning model is trained by an evolution strategy in the present embodiment, which, on the one hand, can overcome the problem in the prior art that a training sequence is too long in the training of the meta-learning model, and on the other hand, can simplify a training process of the meta-learning model and improve the training efficiency of the meta-learning model.

In the present embodiment, after the meta-learning model is trained, parameters of the optimizer can be output according to the input neural network attribute information and neural network optimizer information, so as to implement self-adaptation of the optimizer and have generalization capability to neural networks with different structures and different tasks.

According to the above method provided in the present embodiment, a meta-learning model is established to estimate parameters of optimizers of neural networks, so that the optimizers of the neural networks can be automatically adapted to neural networks having different attribute information, which implements self-adaptation of the optimizers, speeds up training processes of the neural networks, and improves training effects of the neural networks.

Figure 2:
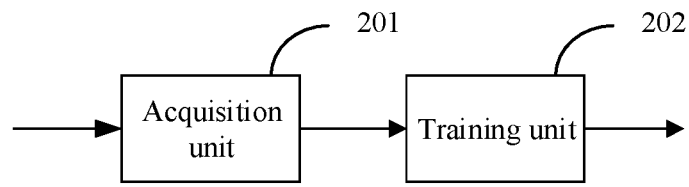
FIG. 2 is a schematic diagram of a second embodiment according to the present application.

FIG. 2 is a schematic diagram of a second embodiment according to the present application. As shown in FIG. 2, an optimizer learning apparatus in the present embodiment includes:

an acquisition unit 201 configured to acquire training data, the training data including a plurality of data sets each comprising neural network attribute information, neural network optimizer information, and optimizer parameter information; and a training unit 202 configured to train a meta-learning model by taking the neural network attribute information and the neural network optimizer information in the data sets as input and taking the optimizer parameter information in the data sets as output, until the meta-learning model converges.

The neural network attribute information acquired by the acquisition unit 201 in the present embodiment includes at least one of neural network structure information and neural network task information, and is used to reflect network structures of neural networks and types of trained tasks.

The neural network optimizer information acquired by the acquisition unit 201 in the present embodiment represents types of optimizers that update neural network parameters. The optimizer parameter information corresponds to parameters of optimizers in each step of the training process of neural networks.

After the acquisition unit 201 acquires the data sets, the training unit 202 trains a meta-learning model according to the above information included in each data set, until the meta-learning model converges. The meta-learning model in the training unit 202 may be a neural network model.

When the training unit 202 trains the meta-learning model according to the data sets, a loss function may be calculated according to an output result of the meta-learning model and parameter information in the data sets. When the calculated loss function converges, the meta-learning model may be considered to converge, and the training process of the meta-learning model is completed. In addition, the training unit 202 may also perform meta learning based on a gradient or recursive model to obtain the meta-learning model, which is not limited in the present embodiment.

In order to further improve the training effect of the meta-learning model, when training the meta-learning model according to the data sets, the training unit 202 may employ the following manner: taking a parameter of a current meta-learning model as a first parameter; jittering the first parameter by using noise, to acquire a plurality of jitter parameters; constructing a plurality of jitter meta-learning models according to the plurality of jitter parameters; training the plurality of jitter meta-learning models respectively by taking the neural network attribute information and the neural network optimizer information in the data sets as input and taking the optimizer parameter information in the data sets as output; and selecting, according to training results, a jitter meta-learning model satisfying a preset condition as a final meta-learning model.

It is understandable that the training unit 202 may select the jitter meta-learning model with the smallest loss function as the meta-learning model satisfying the preset condition, or may select the jitter meta-learning model with the fastest convergence speed as the meta-learning model satisfying the preset condition.

In addition, in order to further improve the training accuracy of the meta-learning model, when selecting a jitter meta-learning model satisfying a preset condition as a final meta-learning model according to training results, the training unit 202 may employ the following manner: determining, according to the training results, a jitter parameter of the jitter meta-learning model satisfying the preset condition; proceeding to the step of jittering the first parameter by using noise after the determined jitter parameter is taken as the first parameter; and taking the selected jitter meta-learning model as the final meta-learning model after a preset number of iterations. The preset number in the present embodiment may be set by a user according to an actual requirement.

In other words, the training unit 202 trains the meta-learning model by an evolution strategy, which, on the one hand, can overcome the problem in the prior art that a training sequence is too long in the training of the meta-learning model, and on the other hand, can simplify a training process of the meta-learning model and improve the training efficiency of the meta-learning model.

After the training unit 202 trains the meta-learning model, parameters of the optimizer can be output by using the meta-learning model according to the input neural network attribute information and neural network optimizer information.

According to embodiments of the present application, the present application further provides an electronic device and a readable storage medium.

Figure 3:
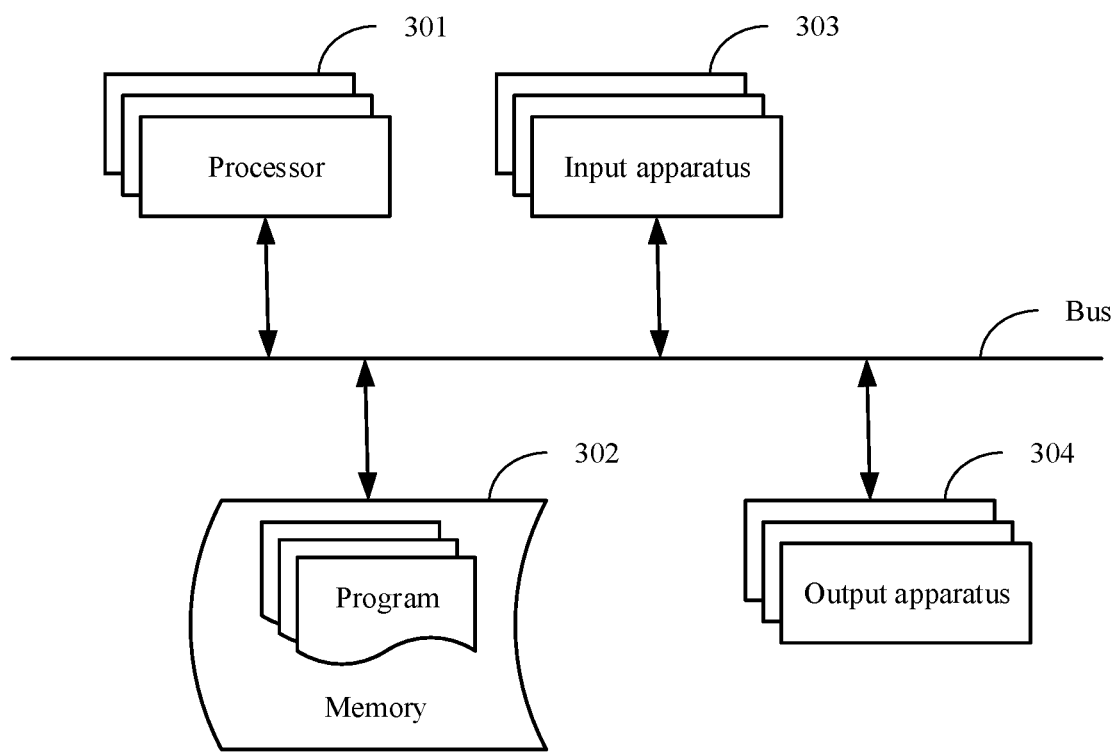
FIG. 3 is a block diagram of an electronic device configured to implement an optimizer learning method according to an embodiment of the present application.

As shown in FIG. 3, it is a block diagram of an electronic device for an optimizer learning method according to an embodiment of the present application. The electronic device is intended to represent various forms of digital computers, such as laptops, desktops, workbenches, personal digital assistants, servers, blade servers, mainframe computers and other suitable computers. The electronic device may further represent various forms of mobile devices, such as personal digital assistant, cellular phones, smart phones, wearable devices and other similar computing devices. The components, their connections and relationships, and their functions shown herein are examples only, and are not intended to limit the implementation of the present application as described and/or required herein.

As shown in FIG. 3, the electronic device includes: one or more processors 301, a memory 302, and interfaces for connecting various components, including high-speed interfaces and low-speed interfaces. The components are connected to each other by using different buses and may be installed on a common motherboard or otherwise as required. The processor may process instructions executed in the electronic device, including instructions stored in the memory or on the memory to display graphical information of a graphical user interface (GUI) on an external input/output apparatus (such as a display device coupled to the interfaces). In other implementations, a plurality of processors and/or buses may be used together with a plurality of memories, if necessary. Similarly, a plurality of electronic devices may be connected, each of which provides some necessary operations (for example, as a server array, a set of blade servers, or a multiprocessor system). One processor 301 is taken as an example is FIG. 3.

The memory 302 is the non-instantaneous computer-readable storage medium according to the present application. The memory stores instructions executable by at least one processor to make the at least one processor perform the optimizer learning method according to the present application. The non-instantaneous computer-readable storage medium according to the present application stores computer instructions. The computer instructions are used to make a computer perform the optimizer learning method according to the present application.

The memory 302, as a non-instantaneous computer-readable storage medium, may be configured to store non-instantaneous software programs, non-instantaneous computer executable programs and modules, for example, program instructions/modules corresponding to the optimizer learning method in the embodiment of the present application (e.g., the acquisition unit 201 and the training unit 202 shown in FIG. 2). The processor 301 runs the non-instantaneous software programs, instructions and modules stored in the memory 302 to execute various functional applications and data processing of a server, that is, to implement the optimizer learning method in the above method embodiment.

The memory 302 may include a program storage area and a data storage area. The program storage area may store an operating system and an application required by at least one function; and the data storage area may store data created according to use of the electronic device. In addition, the memory 302 may include a high-speed random access memory, and may further include a non-instantaneous memory, for example, at least one disk storage device, a flash memory device, or other non-instantaneous solid-state storage devices. In some embodiments, the memory 302 optionally includes memories remotely disposed relative to the processor 301. The remote memories may be connected to the electronic device for the optimizer learning method over a network. Examples of the network include, but are not limited to, the Internet, intranets, local area networks, mobile communication networks and combinations thereof.

The electronic device for the optimizer learning method may further include: an input apparatus 303 and an output apparatus 304. The processor 301, the memory 302, the input apparatus 303 and the output apparatus 304 may be connected through a bus or in other manners. In FIG. 3, the connection through a bus is taken as an example.

The input apparatus 303 may receive input numerical information or character information, and generate key signal input related to user setting and function control of the electronic device for the optimizer learning method, for example, input apparatuses such as a touch screen, a keypad, a mouse, a trackpad, a touch pad, a pointer, one or more mouse buttons, a trackball, and a joystick. The output apparatus 304 may include a display device, an auxiliary lighting apparatus (e.g., an LED) and a tactile feedback apparatus (e.g., a vibration motor). The display device may include, but is not limited to, a liquid crystal display (LCD), a light-emitting diode (LED) display, and a plasma display. In some implementations, the display device may be a touch screen.

Various implementations of the systems and technologies described herein may be implemented in a digital electronic circuit system, an integrated circuit system, an application-specific integrated circuit (ASIC), computer hardware, firmware, software, and/or combinations thereof. The various implementations may include: being implemented in one or more computer programs. The one or more computer programs may be executed and/or interpreted on a programmable system including at least one programmable processor. The programmable processor may be a special-purpose or general-purpose programmable processor, receive data and instructions from a storage system, at least one input apparatus and at least one output apparatus, and transmit the data and the instructions to the storage system, the at least one input apparatus and the at least one output apparatus.

The computing programs (also referred to as programs, software, software applications, or code) include machine instructions for programmable processors, and may be implemented by using high-level procedural and/or object-oriented programming languages, and/or assembly/machine languages. As used herein, the terms "machine-readable medium" and "computer-readable medium" refer to any computer program product, device, and/or apparatus (e.g., a magnetic disk, an optical disc, a memory, and a programmable logic device (PLD)) configured to provide machine instructions and/or data to a programmable processor, including a machine-readable medium that receives machine instructions serving as machine-readable signals. The term "machine-readable signal" refers to any signal for providing the machine instructions and/or data to the programmable processor.

To provide interaction with a user, the systems and technologies described here can be implemented on a computer. The computer has: a display apparatus (e.g., a cathode-ray tube (CRT) or an LCD monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN), and the Internet.

The computer system may include a client and a server. The client and the server are generally far away from each other and generally interact via the communication network. A relationship between the client and the server is generated through computer programs that run on a corresponding computer and have a client-server relationship with each other.

According to the technical solutions in the embodiments of the present embodiment, a meta-learning model is established to learn parameters of optimizers of neural networks having different attribute information and optimizer information, so that the optimizers of the neural networks can be automatically adapted to neural networks having different attribute information, which implements self-adaptation of the optimizers, improves generalization capability of the optimizers, then speeds up training processes of the neural networks, and improves training effects of the neural networks.

It shall be understood that the steps can be reordered, added, or deleted using the various forms of processes shown above. For example, the steps described in the present application may be executed in parallel or sequentially or in different sequences, provided that desired results of the technical solutions disclosed in the present application are achieved, which is not limited herein.

The above specific implementations do not limit the extent of protection of the present application. Those skilled in the art should understand that various modifications, combinations, sub-combinations, and replacements can be made according to design requirements and other factors. Any modifications, equivalent substitutions and improvements made within the spirit and principle of the present application all should be included in the extent of protection of the present application.

What is claimed is:

1. A computer-implemented optimizer learning method, comprising:
    acquiring training data, the training data comprising a plurality of data sets each comprising neural network attribute information, neural network optimizer information, and optimizer parameter information; and
    training a meta-learning model by taking the neural network attribute information and the neural network optimizer information in the data sets as input and taking the optimizer parameter information in the data sets as output, until the meta-learning model converges,
    wherein the neural network attribute information comprises at least one of neural network structure information and neural network task information, the neural network optimizer information is information of a type of the optimizer, and the neural network task information comprises one of a classification task and a recognition task,
        wherein the training a meta-learning model by taking the neural network attribute information and the neural network optimizer information in the data sets as input and taking the optimizer parameter information in the data sets as output comprises:
        using a parameter of a current meta-learning model as a first parameter; jittering the first parameter regarding the meta-learning model by changing the first parameter using a Gaussian noise, to acquire a plurality of jitter parameters;
        replacing the first parameter with the plurality of jitter parameters to construct a plurality of jitter meta-learning models according to the plurality of jitter parameters;
        training the plurality of jitter meta-learning models respectively by taking the neural network attribute information and the neural network optimizer information in the data sets as input and taking the optimizer parameter information in the data sets as output, wherein the data sets used in the training of the jitter meta-learning models is the same or different; and
        selecting, according to training results, a jitter meta-learning model with the smallest loss function or a jitter meta-learning model with the fastest convergence speed as a final meta-learning model.

2. The method according to claim 1, wherein the selecting, according to training results, a jitter meta-learning model with the smallest loss function or a jitter meta-learning model with the fastest convergence speed as a final meta-learning model comprises:
    determining, according to the training results, a jitter parameter of the jitter meta-learning model with the smallest loss function or a jitter meta-learning model with the fastest convergence speed;
    proceeding to the step of jittering the first parameter by using noise after the determined jitter parameter is used as the first parameter; and
    taking the selected jitter meta-learning model as the final meta-learning model after a preset number of iterations of the training of the meta-learning model.

3. An electronic device, comprising:
    at least one processor; and
    a memory communicatively connected with the at least one processor;
    wherein the memory stores instructions executable by the at least one processor, and the instructions are executed by the at least one processor to enable the at least one processor to perform an optimizer learning method, wherein the optimizer learning method comprise:
    acquiring training data, the training data comprising a plurality of data sets each comprising neural network attribute information, neural network optimizer information, and optimizer parameter information; and
    training a meta-learning model by taking the neural network attribute information and the neural network optimizer information in the data sets as input and taking the optimizer parameter information in the data sets as output, until the meta-learning model converges,
    wherein the neural network attribute information comprises at least one of neural network structure information and neural network task information, the neural network optimizer information is information of a type of the optimizer, and the neural network task information comprises one of a classification task and a recognition task,
    wherein the training a meta-learning model by taking the neural network attribute information and the neural network optimizer information in the data sets as input and taking the optimizer parameter information in the data sets as output comprises:
    using a parameter of a current meta-learning model as a first parameter;
    jittering the first parameter regarding the meta-learning model by changing the first parameter using a Gaussian noise, to acquire a plurality of jitter parameters;
    replacing the first parameter with the plurality of jitter parameters to construct a plurality of jitter meta-learning models according to the plurality of jitter parameters;
    training the plurality of jitter meta-learning models respectively by taking the neural network attribute information and the neural network optimizer information in the data sets as input and taking the optimizer parameter information in the data sets as output, wherein the data sets used in the training of the jitter meta-learning models is the same or different; and
    selecting, according to training results, a jitter meta-learning model with the smallest loss function or a jitter meta-learning model with the fastest convergence speed as a final meta-learning model.

4. The electronic device according to claim 3, wherein the selecting, according to training results, a jitter meta-learning model with the smallest loss function or a jitter meta-learning model with the fastest convergence speed as a final meta-learning model comprises:
  determining, according to the training results, a jitter parameter of the jitter meta-learning model with the smallest loss function or a jitter meta-learning model with the fastest convergence speed;
  proceeding to the step of jittering the first parameter by using noise after the determined jitter parameter is used as the first parameter; and
  taking the selected jitter meta-learning model as the final meta-learning model after a preset number of iterations of the training of the meta-learning model.

5. A non-transitory computer readable storage medium with computer instructions stored thereon, wherein the computer instructions are used for causing a computer to perform an optimizer learning method, wherein the optimizer learning method comprise:
  acquiring training data, the training data comprising a plurality of data sets each comprising neural network attribute information, neural network optimizer information, and optimizer parameter information; and
  training a meta-learning model by taking the neural network attribute information and the neural network optimizer information in the data sets as input and taking the optimizer parameter information in the data sets as output, until the meta-learning model converges,
  wherein the neural network attribute information comprises at least one of neural network structure information and neural network task information, the neural network optimizer information is information of a type of the optimizer, and the neural network task information comprises one of a classification task and a recognition task, wherein the training a meta-learning model by taking the neural network attribute information and the neural network optimizer information in the data sets as input and taking the optimizer parameter information in the data sets as output comprises:
    using a parameter of a current meta-learning model as a first parameter; jittering the first parameter regarding the meta-learning model by changing the first parameter using a Gaussian noise, to acquire a plurality of jitter parameters;
    replacing the first parameter with the plurality of jitter parameters to construct a plurality of jitter meta-learning models according to the plurality of jitter parameters;
    training the plurality of jitter meta-learning models respectively by taking the neural network attribute information and the neural network optimizer information in the data sets as input and taking the optimizer parameter information in the data sets as output, wherein the data sets used in the training of the jitter meta-learning models is the same or different; and
    selecting, according to training results, a jitter meta-learning model with the smallest loss function or a jitter meta-learning model with the fastest convergence speed as a final meta-learning model.

6. The non-transitory computer readable storage medium according to claim 5, wherein the selecting, according to training results, a jitter meta-learning model with the smallest loss function or a jitter meta-learning model with the fastest convergence speed as a final meta-learning model comprises:
  determining, according to the training results, a jitter parameter of the jitter meta-learning model with the smallest loss function or a jitter meta-learning model with the fastest convergence speed;
  proceeding to the step of jittering the first parameter by using noise after the determined jitter parameter is used as the first parameter; and
  taking the selected jitter meta-learning model as the final meta-learning model after a preset number of iterations of the training of the meta-learning model.

* * * * *